United States Patent [19]

Kosar et al.

[11] Patent Number: 5,377,761
[45] Date of Patent: Jan. 3, 1995

[54] GROUND FRACTURING PROBE

[75] Inventors: Keith M. Kosar; H. Glen Gilchrist, both of Calgary; Gordon T. Guest, Bragg Creek; Bryan Leach, Calgary, all of Canada

[73] Assignee: Golder Associates Ltd., Canada

[21] Appl. No.: 102,407

[22] Filed: Aug. 5, 1993

[51] Int. Cl.[6] .................. E21B 43/26; E21B 17/22
[52] U.S. Cl. ............................ 166/308; 166/222; 175/323; 175/394
[58] Field of Search ............ 175/323, 394, 21, 67; 166/308, 222, 223

[56] References Cited

U.S. PATENT DOCUMENTS

| | | | |
|---|---|---|---|
| 2,758,653 | 8/1956 | Desbrow | 166/308 X |
| 2,851,109 | 9/1958 | Spearow | 166/308 X |
| 3,167,124 | 1/1965 | Graham | 166/308 X |
| 3,224,506 | 12/1965 | Huitt et al. | 166/308 X |
| 4,043,410 | 8/1977 | Bennett et al. | 175/323 |
| 4,046,205 | 9/1977 | Asayama | 175/394 X |
| 4,061,197 | 12/1977 | Skidmore, Jr. | 175/101 |
| 4,458,765 | 7/1984 | Feklin et al. | 175/19 |
| 4,496,011 | 1/1985 | Mazo et al. | 175/394 X |
| 4,540,055 | 9/1985 | Drummond et al. | 175/323 |
| 4,779,681 | 10/1988 | York | 166/308 |

FOREIGN PATENT DOCUMENTS 248839  6/1926  Italy .................. 175/394

Primary Examiner—Hoang C. Dang
Attorney, Agent, or Firm—D. Peter Hochberg; Mark Kusner; Michael Jaffe

[57] ABSTRACT

A ground fracturing probe to form fractures in subsurface formations includes an elongate, hollow body with a conical penetrating tip at its distal end. A threaded tool joint is at the other end of the body to allow the probe to be coupled to the drill string of a drilling rig. A helical flight is on the exterior surface of the body and extends along a portion of the body length between the tool joint and the penetrating tip. The helical flight varies in diameter over its length to define a cutting zone adjacent the penetrating tip, an injection zone above the cutting zone and a sealing zone above the injection zone. The helical flight increases in diameter in the cutting zone from the tip to the injection zone but decreases abruptly in diameter at the injection zone. The diameter of the flight remains constant in the injection zone and increases in diameter at the interface between the injection zone and the sealing zone. The diameter of the flight remains constant over the length of the sealing zone but is greater in diameter in the sealing zone than in the cutting zone. Orifices are provided in the body within the injection zone and communicate with the interior of the body to allow fluid pumped into the body under pressure to be discharged. The increased diameter of the flight in the sealing zone inhibits discharged fluid from travelling to the ground surface along the probe.

30 Claims, 2 Drawing Sheets

5,377,761

GROUND FRACTURING PROBE

FIELD OF THE INVENTION

The present invention relates to probes and in particular to a ground fracturing probe to form fractures in subsurface formations to improve the effectiveness of remediating subsurface soil and groundwater contamination.

BACKGROUND OF THE INVENTION

Environmental issues are of concern and current forecasts are that concern over pollution will only increase. In many areas, subsurface soil and groundwater contamination is a problem and it is necessary to remediate the subsurface contamination. To improve the effectiveness of methods used to remediate subsurface soil and groundwater contamination, fractures are created in the contaminated subsurface formations. The fractures create preferred seepage paths through the subsurface formations which increase the gross permeability of the formations and therefore, facilitate removal of contaminants.

Many devices for penetrating the ground to assist in creating fractures in subsurface formations or to cut and remove cut material have been considered. For example, U.S. Pat. No. 2,758,653 to Desbrow discloses an apparatus for penetrating and hydraulically fracturing well formations. The apparatus includes a jet head on the distal end of a casing, extending down into the well formation. Nozzles having orifices are provided in the jet head. The orifices communicate with the interior of the casing and the interior of the jet head. Pressurized fluid is pumped into the casing and out of the orifices to form cuts in the surrounding formations.

U.S. Pat. No. 4,061,197 to Skidmore, Jr discloses an auger to penetrate the ground having a helical flight attached to a hollow central tube. The auger is designed to fit over a percussion hammer. Vent holes are provided at the bottom of the auger and are angled in the direction of the flight to assist upward movement of cuttings. Cutting teeth are provided at the bottom of the helical flight.

U.S. Pat. No. 4,458,765 to Feklin et al discloses a tool for forming a hole in compressible soft and tier compacting the soil during formation of the hole. The tool includes a plurality of coaxial cylindrical portions which decrease in diameter from a sizing part to a tool tip. Adjacent cylindrical portions define steps and are successively conjugated by transition portions. An axial bore is formed in the tool to allow fluid to flow through orifices to assist in forming the hole without causing any soil destruction.

U.S. Pat. No. 5,135,058 to Millgard et al discloses a drill bit having drill teeth extending downwardly from the closed end of a sleeve. Radially extending drill blades are fixed to the sleeve. Cutting teeth are provided along the length of the blades. A pipe extends along the rear surface of each blade and has a plurality of orifices provided in it along its length. Fluid is pumped through the sleeve, along the pipes and out of the orifices to assist in cutting or removing of cut material.

Pat. No. 4,540,055 to Drummond et al discloses a drill bit having an adaptor sub and a bit. The sub has three passages permitting fluid flow from within the sub. Nozzles discharge fluid upwardly along the sub. Guides are provided on the exterior surface of the sub to direct fluid flow upwardly along the sub and drill string.

Although devices exist for penetrating the ground which include means to discharge fluid to create cuts in surrounding formations or to assist in the cutting and/or removal of cut material, devices specifically developed to create fractures in surrounding subsurface formations for the purpose of remediating subsurface soil and groundwater contamination have been overlooked. It is therefore an object of the present invention to provide a novel method and ground fracturing probe the forming fractures in subsurface formations.

SUMMARY OF THE INVENTION

According to one aspect of the present invention there is provided a ground fracturing probe to form fractures in a subsurface formation comprising an elongate body with a cutting element along at least a portion of its exterior surface; an area of reduced dimension along said probe to define an injection zone; means positioned in said injection zone to discharge fluid under pressure to contact said subsurface formation and initiate a fracture therein; and sealing means above said injection zone to inhibit discharged fluid from travelling upwardly along said probe.

Preferably the cutting element has the area of reduced dimension with the area of reduced dimension being positioned intermediate the length of the cutting element. It is also preferred that the cutting element is of an increased dimension above the injection zone than below the injection zone to define a sealing zone above the injection zone and constitute the sealing means. It is also preferred that the distal end of the probe has a penetrating tip thereon and that the cutting element increases gradually in dimension from the cutting tip to the injection zone to define a cutting zone below the injection zone.

Preferably the cutting element is in the form of a helical flight extending along the body which decreases abruptly in diameter at the junction between the cutting zone and the injection zone. It is also preferred that the flight increases in diameter at a constant rate at the junction between the injection zone and the sealing zone, the flight at the injection zone defining a notch in the subsurface formation at which the fracture is to be formed. Preferably, the flight is constant in diameter in the injection zone.

Preferably, the discharge means is constituted by a pair of orifices provided in the body within the injection zone, the orifices communicating with the interior of the body and being diametrically opposed with respect to the longitudinal axis of the body. It is also preferred that the orifices are located in the plane of the flight so that they are vertically spaced with respect to one another.

According to another aspect of the present invention there is provided a method of creating a fracture in a subsurface formation comprising the steps of:
 (i) forming a void in said formation;
 (ii) injecting the formation with at least one pressurized stream of fluid at a selected depth within said void to create a fracture in said formation; and
 (iii) sealing the void above said at least one pressurized stream to inhibit fluid from travelling upwardly along the void towards the ground surface.

Preferably, the void is formed having a smaller diameter portion adjacent the bottom of the void and a larger diameter portion vertically spaced from the bottom of the void. It is also preferred that the void is sealed at the larger diameter portion adjacent the interface between the larger and smaller diameter portions.

Preferably, the void is helical with the larger and smaller diameter portions being formed simultaneously. It is also preferred that the formation is injected with more than one pressurized stream to cream multiple fractures in the formation simultaneously. Moreover, it is preferred that the depth of the void is increased after a fracture has been created and steps (ii) and (iii) are repeated at an increased depth to create fractures in the formation at different depths.

The present invention provides advantages in that fractures can be formed while inhibiting the fluid used to initiate and propagate the fractures from reaching the ground surface. In the preferred embodiment, this is achieved by reducing the diameter of the probe's flight abruptly in the injection zone to define a notch spaced from the surrounding formation and increasing the diameter of the flight above the notch beyond the diameter of the flight below the notch, to provide a seal above the injection zone. Also, the present invention allows fractures to be initiated and propagated at different depths in basically a continuous process by creating the initial fracture closest to the ground surface and then advancing the probe into the ground until the injection zone reaches the next location where a fracture is to be formed.

BRIEF DESCRIPTION OF THE DRAWINGS

An embodiment of the present invention will now be more fully described with reference to the accompanying drawings in which.

DESCRIPTION OF THE PREFERRED EMBODIMENT

Figure 1:
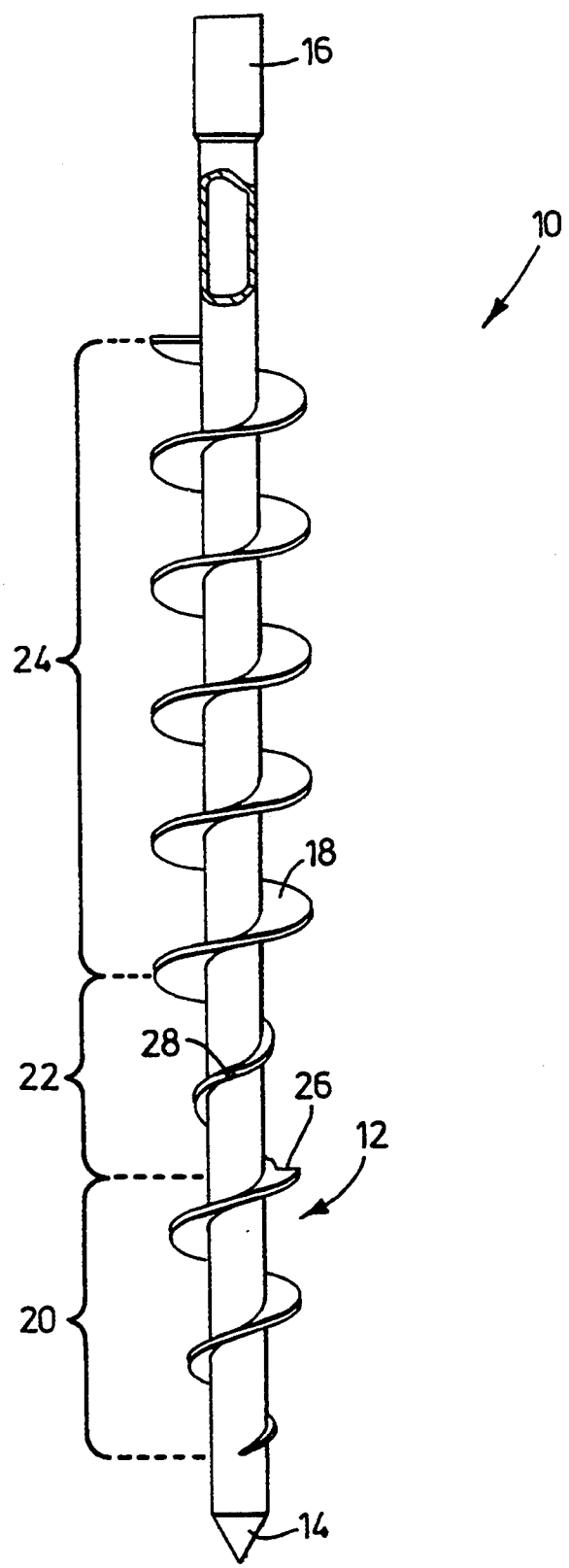
FIG. 1 is a side elevation view, partially in section, of a ground fracturing probe in accordance with the present invention.
Figure 2:
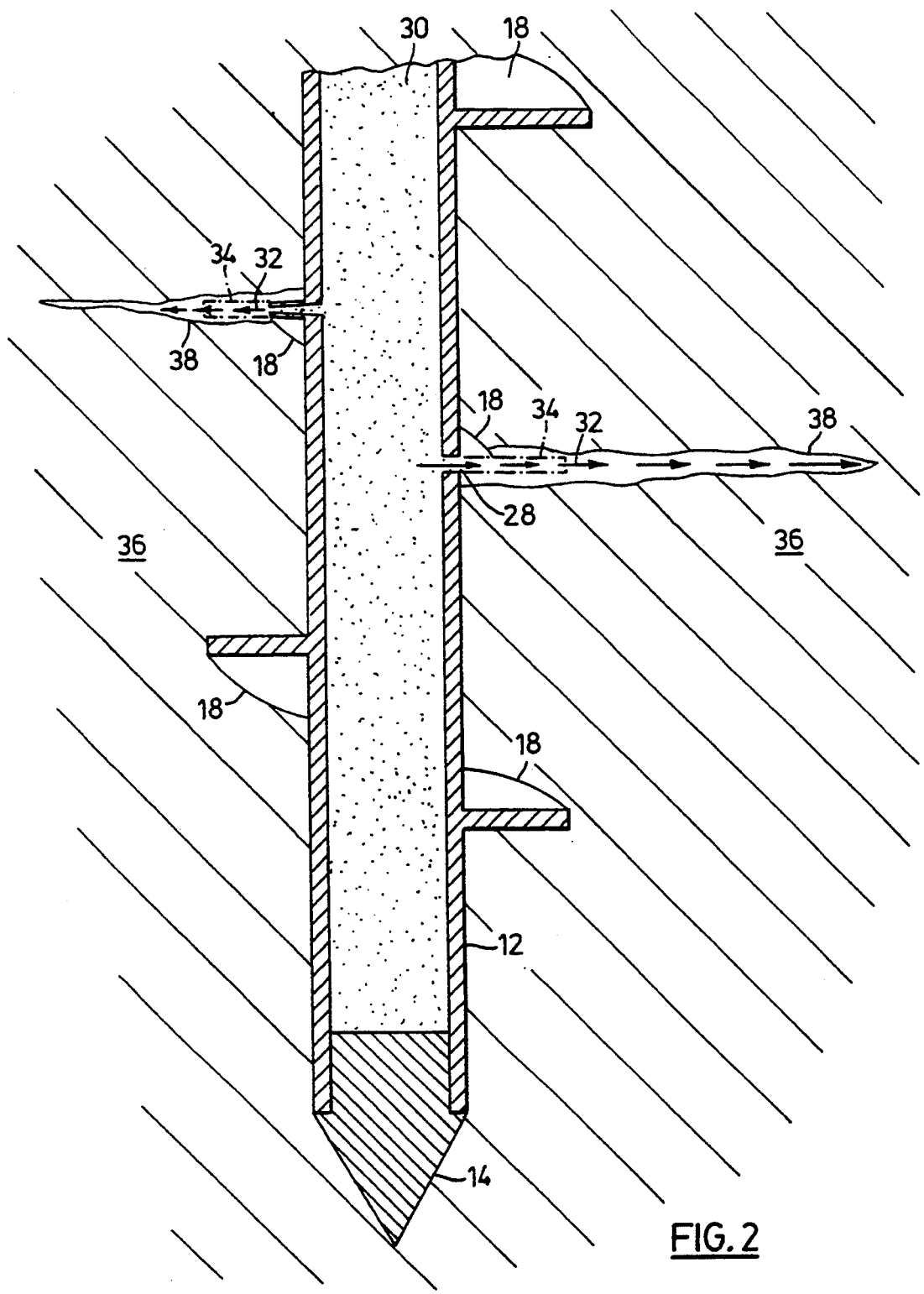
FIG. 2 is an enlarged cross-section of a portion of the ground fracturing probe illustrated in FIG. 1.

Referring now to FIGS. 1 and 2, a ground fracturing probe is shown and is generally indicated by reference numeral 10. The probe 10 is designed to form fractures in subsurface formations to increase the gross permeability of the subsurface formations. This improves the effectiveness of methods to remediate in situ, subsurface soil and groundwater contamination through either the introduction into, or the removal of fluids from the subsurface formations. As such, the probe 10 can be used to improve the effectiveness of subsurface soil and groundwater contamination through methods such as vapour extraction, non-aqueous phase (NAPL) recovery, groundwater pumping and treatment, hydraulic capture and in situ bioremediation.

As can be seen, the probe 10 includes an elongate, hollow, cylindrical steel body 12. Sealing one end of the body is a conical penetrating tip 14. At the opposite end of the body is a hollow threaded tool joint 16 keyed to allow reverse rotation of the probe 10. A helical flight 18 is on the exterior of the body 10 and extends along an intermediate portion of the body length between the tool joint 16 and the penetrating tip 14.

The flight 18 is not constant in diameter over its entire length but rather varies in diameter to define a cutting zone 20 adjacent the penetrating tip 14, an injection zone 22 above the cutting zone and a sealing zone 24 above the injection zone. In particular, the flight 18 increases gradually in diameter in the cutting zone 20 from the penetrating tip 14 to the injection zone 22. A notch 26 is formed in the flight 18 at the injection zone so that the diameter of the flight decreases abruptly. The diameter of the flight remains constant in the injection zone 22 and increases in diameter at a constant rate at the interface between the injection zone 22 and the sealing zone 24. In the sealing zone 24, the diameter of the flight 18 remains constant but is greater in diameter than in the cutting zone 20.

A pair of orifices 28 are provided in the body 12 within the injection zone 22 and communicate with the hollow interior of the body. The orifices 28 are located in the plane of the flight 18 and are diametrically opposed with respect to the longitudinal axis of the body 10. Since the orifices 28 are located in the plane of the flight 18 they are also vertically spaced with respect to one another.

In use, the probe 10 is attached to the hollow drill string of the drilling rig (not shown) or other conventional drilling mechanism via the tool joint 16. Once this is done, the penetrating tip 14 is brought into contact with the ground surface and the drilling rig is operated to rotate the drill string and hence the probe. As the probe 10 rotates, it advances into the ground. The geometry of the flight 18 in the cutting zone 20 is designed to minimize disturbance of the ground as the probe advances. This operation is continued until the probe 10 has advanced far enough into the ground to position the injection zone 22 at the desired location where a fracture is to be formed.

Once properly positioned, fluid 30 is pumped under pressure into the drill string. Within the context of the specification, the fluid may be in gas or liquid form and usually consists of a fluid laden with a propping agent which is typically sand. The fluid enters the body 12 and is discharged out of the body in high pressure streams 32 via the orifices 28 (see FIG. 2). The reduced diameter of the flight 18 in the injection zone 22 creates a notch 34 between the cutting zone 20 and the sealing zone 24 which represents a discontinuity in the surrounding subsurface formations 36. This discontinuity serves to facilitate formation of fractures 38 in the subsurface formations when contacted by the high pressure streams 32. The increased diameter of the flight in the sealing zone 24 above the injection zone 22 inhibits the discharged fluid from escaping to the ground surface along the probe 10.

Once one or more fractures have been created at the desired depth, the probe 10 can be withdrawn by operating the drilling rig to rotate the drill string in the opposite direction. The viscosity of the fluid in the fracture reverse with time to that approximately of water due to its constituents and can be drained from the fracture leaving a more permeable pathway through the subsurface formation.

The probe 10 can also be used to initiate other fractures in the subsurface formation at different depths in the same borehole in a continuous process. This is achieved by advancing the probe 10 to a greater depth after the first fracture has been formed and repeating the above described process. This can be repeated as necessary to initiate and propagate fractures at different depths in the subsurface formation.

Thus, the present invention allows fractures to be initiated and propagated at different depths in a continuous process while inhibiting the fluid used to fracture the subsurface formation from reaching the ground surface along the probe 10.

Although the present invention has been described as having a continuous helical flight, it should be apparent to one of skill in the art that other cutting element designs can be used on the exterior of the body. It should also be apparent that the arrangement and number of orifices provided on the probe can be varied if desire.

We claim:

1. A ground fracturing probe to form fractures in a subsurface formation comprising:
   an elongate body having an exterior surface;
   a cutting element along at least a portion of said exterior surface;
   an area of reduced dimension along said probe intermediate the length of said cutting element to define an injection zone, said area of reduced dimension creating a notch between said probe and said subsurface formation when said probe enters said subsurface formation;
   means positioned in said injection zone to discharge fluid under pressure to contact said subsurface formation and initiate a fracture therein; and
   sealing means above said injection zone to inhibit discharged fluid from travelling upwardly along said probe.

2. A ground fracturing probe as defined in claim 1 wherein said cutting element has said area of reduced dimension.

3. A ground fracturing probe as defined in claim 2 wherein said cutting element is greater in dimension above said injection zone than below said injection zone to define a sealing zone above said injection zone and constitute said sealing means.

4. A ground fracturing probe as defined in claim 3 wherein the distal end of said body has a penetrating tip thereon and wherein said cutting element increases gradually in dimension from said tip to said injection zone to define a cutting zone below said injection zone.

5. A ground fracturing probe as defined in claim 4 wherein said cutting element abruptly decreases in dimension at the junction between the cutting zone and the injection zone.

6. A ground fracturing probe as defined in claim 5 wherein said cutting element is in the form of a helical flight extending along said body.

7. A ground fracturing probe as defined in claim 6 wherein said flight is continuous.

8. A ground fracturing probe as defined in claim 7 wherein said flight is generally constant in diameter in said injection zone and wherein at least two orifices are provided in said body within said injection zone to define said discharge means, said at least two orifices communicating with the interior of said body and receiving pressurized fluid therefrom.

9. A ground fracturing probe as defined in claim 8 wherein said orifices are diametrically opposed with respect to the longitudinal axis of said body.

10. A ground fracturing probe as defined in claim 9 wherein said orifices are located in the plane of said flight.

11. A ground fracturing probe as defined in claim 4 wherein said cutting element is in the form of a continuous, helical flight.

12. A ground fracturing probe as defined in claim 11 wherein said flight increases gradually in diameter in said cutting zone from the penetrating tip to said injection zone, abruptly decreases in diameter at said injection zone and increases in diameter at a constant rate at the junction between said sealing zone and said injection zone, said flight at said injection zone defining a notch in the subsurface formation at which said fracture is to be formed.

13. A ground fracturing probe as defined in claim 12 wherein said flight is generally constant in diameter in said sealing zone.

14. A ground fracturing probe as defined in claim 13 wherein said flight is generally constant in diameter in said injection zone and wherein a pair of orifices are provided in said body within said injection zone to define said discharge means, said orifices communicating with the interior of said body and being diametrically opposed with respect to the longitudinal axis of said body, said orifices receiving pressurized fluid from said body.

15. A ground fracturing probe as defined in claim 14 wherein said orifices are located in the plane of said flight.

16. A ground fracturing probe as defined in claim 1 wherein said discharge means is positioned in the plane of said cutting element.

17. A ground fracturing probe as defined in claim 16 wherein said discharge means is in the form of at least one orifice provided in said body within said injection zone, said at least one orifice communicating with the interior of said body and receiving pressurized fluid therefrom.

18. A method of creating a fracture in a subsurface formation comprising the steps of:
   (i) advancing a probe into a subsurface formation, said probe having an exterior surface with a cutting element thereon, said probe further including an area of reduced dimension along its length intermediate the length of said cutting element to define an injection zone, said area of reduced dimension creating a notch between said probe and said subsurface formation;
   (ii) injecting the subsurface formation with at least one pressurized stream of fluid at said notch to create a fracture in said subsurface formation; and
   (iii) providing a seal above said notch to inhibit fluid from travelling upwardly along the exterior of the probe towards the ground surface.

19. The method of claim 18 wherein at step (ii), the subsurface formation is injected with more than one pressurized stream of fluid to create multiple fractures in said subsurface formation.

20. The method of claim 18 further comprising the step of further advancing said probe into said subsurface formation after a fracture has been created and repeating steps (ii) and (iii) at an increased depth to create fractures in said subsurface formation at different depths.

21. A ground fracturing probe to form fractures in a subsurface formation comprising:
   an elongate body having an exterior surface;
   a cutting element on said exterior surface having an area of reduced dimension therealong intermediate its length to define an injection zone, said area of reduced dimension creating a notch between said probe and said subsurface formation when said probe enters said subsurface formation;
   means positioned in said injection zone to discharge fluid under pressure to contact said subsurface formation and initiate a fracture therein; and sealing means above said injection zone to inhibit discharged fluid from travelling upwardly along said probe.

22. A ground fracturing probe as defined in claim 21 wherein said discharge means is positioned in the plane of said cutting element.

23. A ground fracturing probe as defined in claim 22 wherein said discharge means is in the form of at least one orifice provided in said body within said injection zone, said at least one orifice communicating with the interior of said body and receiving pressurized fluid therefrom.

24. A ground fracturing probe as defined in claim 22 wherein said cutting element is in the form of a helical flight, said flight decreasing abruptly in dimension at said injection zone to define said area of reduced dimension, said flight increasing in dimension above said injection zone to constitute said sealing means.

25. A method of creating a fracture in a subsurface formation comprising the steps of:
(i) advancing a probe into a subsurface formation, said probe having an exterior surface with a cutting element thereon, said cutting element including an area of reduced dimension intermediate its length to define an injection zone, said area of reduced dimension creating a notch between said probe and said subsurface formation;
(ii) injecting the subsurface formation with at least one pressurized stream of fluid at said notch to create a fracture in said subsurface formation; and
(iii) providing a seal above said notch to inhibit fluid from travelling upwardly along the exterior of the probe towards the ground surface.

26. The method of claim 25 wherein at step (ii) the subsurface formation is injected with more than one pressurized stream of fluid to create multiple fractures in said subsurface formation.

27. The method of claim 25 further comprising the step of further advancing said probe into said subsurface formation after a fracture has been created and repeating steps (ii) and (iii) at an increased depth to create fractures in said subsurface formation at different depths.

28. A ground fracturing probe to form fractures in a subsurface formation comprising:
an elongate body having an exterior surface and a penetrating tip at a distal end thereof;
a cutting element in the form of a helical flight on said exterior surface, said flight decreasing abruptly in dimension intermediate the length thereof to define an injection zone, said flight creating a notch between said probe and said subsurface formation at said injection zone when said probe enters said subsurface formation, said flight increasing gradually in dimension from said penetrating tip to said injection zone to define a cutting zone below said injection zone, said flight increasing in dimension above said injection zone beyond the dimension of said flight in said cutting zone to define a sealing zone above said injection zone, said flight in said sealing zone, acting as a seal to inhibit discharged fluid from travelling upwardly along the exterior of said probe; and
means positioned in said injection zone to discharge fluid under pressure to contact said subsurface formation and initiate a fracture therein.

29. A ground fracturing probe as defined in claim 28 wherein said discharge means is in the form of at least one orifice provided in said body within said injection zone, said at least one orifice communicating with the interior of said body and receiving pressurized fluid therefrom.

30. A ground fracturing probe as defined in claim 29 wherein said at least one orifice is positioned in the plane of said flight.

* * * * *